(12) United States Patent
Watson et al.

(10) Patent No.: US 10,096,174 B2
(45) Date of Patent: Oct. 9, 2018

(54) METHOD OF CONTROLLING MACHINE FUNCTION BASED ON PERFORMANCE OF A WORK MACHINE MAINTENANCE SCHEDULE AND SYSTEM THEREOF

(71) Applicant: DEERE & COMPANY, Moline, IL (US)

(72) Inventors: Daniel D. Watson, Dubuque, IA (US); Joseph B. Fochs, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/435,453

(22) Filed: Feb. 17, 2017

(65) Prior Publication Data

US 2018/0240287 A1    Aug. 23, 2018

(51) Int. Cl.
*G07C 5/00*     (2006.01)
*G07C 5/08*     (2006.01)
*G06F 19/00*    (2018.01)

(52) U.S. Cl.
CPC ............. *G07C 5/006* (2013.01); *G07C 5/008* (2013.01); *G07C 5/0808* (2013.01)

(58) Field of Classification Search
CPC ....... G07C 5/006; G07C 5/008; G07C 5/0808
USPC ......................... 701/50; 172/4.5, 9
See application file for complete search history.

(56) References Cited

U.S. PATENT DOCUMENTS

| | | |
|---|---|---|
| 6,997,286 B1 | 2/2006 | Funck et al. |
| 8,024,094 B2 | 9/2011 | Furuno |
| 2004/0122576 A1* | 6/2004 | Sorrells ............... B60R 16/0231 701/50 |
| 2005/0085973 A1* | 4/2005 | Furem ................... E02F 9/2054 701/50 |

FOREIGN PATENT DOCUMENTS

| | | |
|---|---|---|
| JP | 2002300666 A2 | 10/2002 |
| WO | 2015158728 A1 | 10/2015 |

* cited by examiner

*Primary Examiner* — Gertrude Arthur Jeanglaude
(74) *Attorney, Agent, or Firm* — Taft Stettinius & Hollister, LLP; Stephen F. Rost (57) ABSTRACT

A method of controlling work machine performance includes providing a controller for controlling at least one machine function and a mobile communication link. The mobile communication link transmits a wireless network and connects to a mobile device via the wireless network when a maintenance schedule mobile application is enabled on the mobile device. The mobile application includes at least one maintenance item to be completed on the work machine before the work machine is enabled to perform the at least one machine function. The method further includes receiving by the mobile communication link a status for the at least one maintenance item, communicating the status to the controller, and determining by the controller if the at least one maintenance item is completed based on the status. The machine is enabled to perform the at least one machine function if the at least one maintenance item is completed.

20 Claims, 4 Drawing Sheets

METHOD OF CONTROLLING MACHINE FUNCTION BASED ON PERFORMANCE OF A WORK MACHINE MAINTENANCE SCHEDULE AND SYSTEM THEREOF

FIELD OF THE DISCLOSURE

The present disclosure relates to a work machine, and in particular, to a method of tracking performance of a maintenance schedule on the work machine.

BACKGROUND OF THE DISCLOSURE

Many work machines, such as a motor grader, can require routine maintenance such as checking fluid levels, tire pressures, air filter quality, and the like. A maintenance schedule, which lists all of the items to be checks, may be provided in a manual or other document with the machine. A machine operator or service technician may then review the schedule and complete the individual maintenance items to ensure the machine operates at optimal performance.

In some instances, however, the operator or technician may not complete the entire list of maintenance items. In other instances, none of the items may be completed. The machine may continue to be operated, even at reduced performance levels, without the maintenance items being checked. This can lead to a further reduction in machine performance, or in some cases, possible damage to the machine. While performing the maintenance checks may ensure better machine performance, there is often no immediate incentive to track or encourage the completion of all maintenance items within a timely manner.

SUMMARY

In one embodiment, a method of controlling performance of a work machine, includes providing a controller for controlling at least one machine function and a mobile communication link; transmitting a wireless network from the mobile communication link; connecting the mobile communication link to a mobile device via the wireless network when a maintenance schedule mobile application is enabled on the mobile device, the mobile application including at least one maintenance item to be completed on the work machine before the work machine is enabled to perform the at least one machine function; receiving by the mobile communication link a status for the at least one maintenance item; communicating the status to the controller; determining by the controller if the at least one maintenance item is completed based on the status; and enabling the machine to perform the at least one machine function if the at least one maintenance item is completed.

In one example of this embodiment, the method may include inhibiting the machine from performing the at least one machine function if the at least one maintenance item is not completed. In a second example, the inhibiting step may include disabling an ignition switch on the work machine. In a third example, the inhibiting step may include limiting engine speed, transmission speed, or ground speed. In a fourth example, the inhibiting step may include limiting engine power. In a fifth example, the inhibiting step may include disabling an implement from performing the at least one machine function. In a sixth example, the inhibiting step may include limiting transmission speed, transmission torque, or transmission operability to a predefined speed or gear ratio.

In a further example of this embodiment the determining step may include detecting if a pin or bushing is greased, an oil level is checked, a tire pressure is checked, a cooler is cleaned, an air filter is checked, a fuel/water separator is drained, a fluid sample is taken, or a mechanical belt is checked. In yet a further example, the method may include sending an alert when the at least one maintenance item is not completed. In a different example, the method may include executing the enabling step for a predefined period of time; alerting a machine operator to complete the at least one maintenance item after the predefined period of time; and inhibiting the machine from performing the at least one machine function after the predefined period of time until the at least one maintenance item is completed.

In another embodiment of the present disclosure, a method of controlling a work machine includes providing a controller for controlling at least one machine function, a mobile communication link, and a maintenance schedule mobile application executable on a mobile communication device, the mobile application including a plurality of maintenance items to be completed at two or more locations on the work machine; transmitting a wireless network from the mobile communication link; receiving by the mobile communication link a status of each of the plurality of maintenance items when the mobile application is being executed; communicating the status of each of the plurality of maintenance items to the controller; determining by the controller if each of the plurality of maintenance items is completed; and controlling the machine to perform the at least one machine function if each of the plurality of maintenance items is completed.

In one example of this embodiment, the method may include providing a communication tag at each of the two or more locations on the work machine; and sending a signal from the communication tag to the mobile communication link when one of the plurality of maintenance items is completed. In a second example, the method may include wirelessly connecting the mobile communication link to the mobile communication device via the wireless network during the receiving step. In a third example, the controlling step may include enabling the machine to perform the at least one machine function for a predefined period of time. In a fourth example, the method may include inhibiting the machine from performing the at least one machine function after the predefined period of time until the plurality of maintenance items are completed.

In a further embodiment of the present disclosure, a control system of a work machine includes a controller for controlling the work machine to perform at least one machine function; an engine control unit for controlling an engine of the work machine, the engine control unit being in electrical communication with the controller; a transmission control unit for controlling a transmission of the work machine, the transmission control unit being in electrical communication with the controller; and a mobile communication controller disposed in electrical communication with the controller, the mobile communication controller configured to transmit a wireless network from a location on the work machine; wherein, the mobile communication controller is adapted to receive a status from a remote communication device regarding one or more maintenance items to be completed on the work machine, and the mobile communication controller operably communicates the status to the controller; further wherein, the controller operably controls the work machine to perform the at least one machine function based on the status.

In one example of this embodiment, the controller operably inhibits the work machine from performing the at least one machine function if the status is indicative of the one or more maintenance items not being completed. In a second example, the control system may include a maintenance schedule mobile application configured to be enabled on the mobile communication device, the mobile application being electrically coupled to the mobile communication controller to send the status regarding the one or more maintenance items.

In a third example, the control system may include a first communication tag coupled to the work machine at a first location and a second communication tag coupled to the work machine at a second location, the first and second communication tags being in electrical communication with the mobile communication controller; wherein, the first tag sends a first status to the mobile communication controller via the wireless network when one maintenance item is completed at the first location, and the second tag sends a second status to the mobile communication controller via the wireless network when a second maintenance item is completed at the second location. In a fourth example, the controller communicates to the engine control unit to limit engine speed or engine power when the one or more maintenance items is not completed; or the controller communicates to the transmission control unit to limit transmission speed or transmission torque when the one or more maintenance items is not completed.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
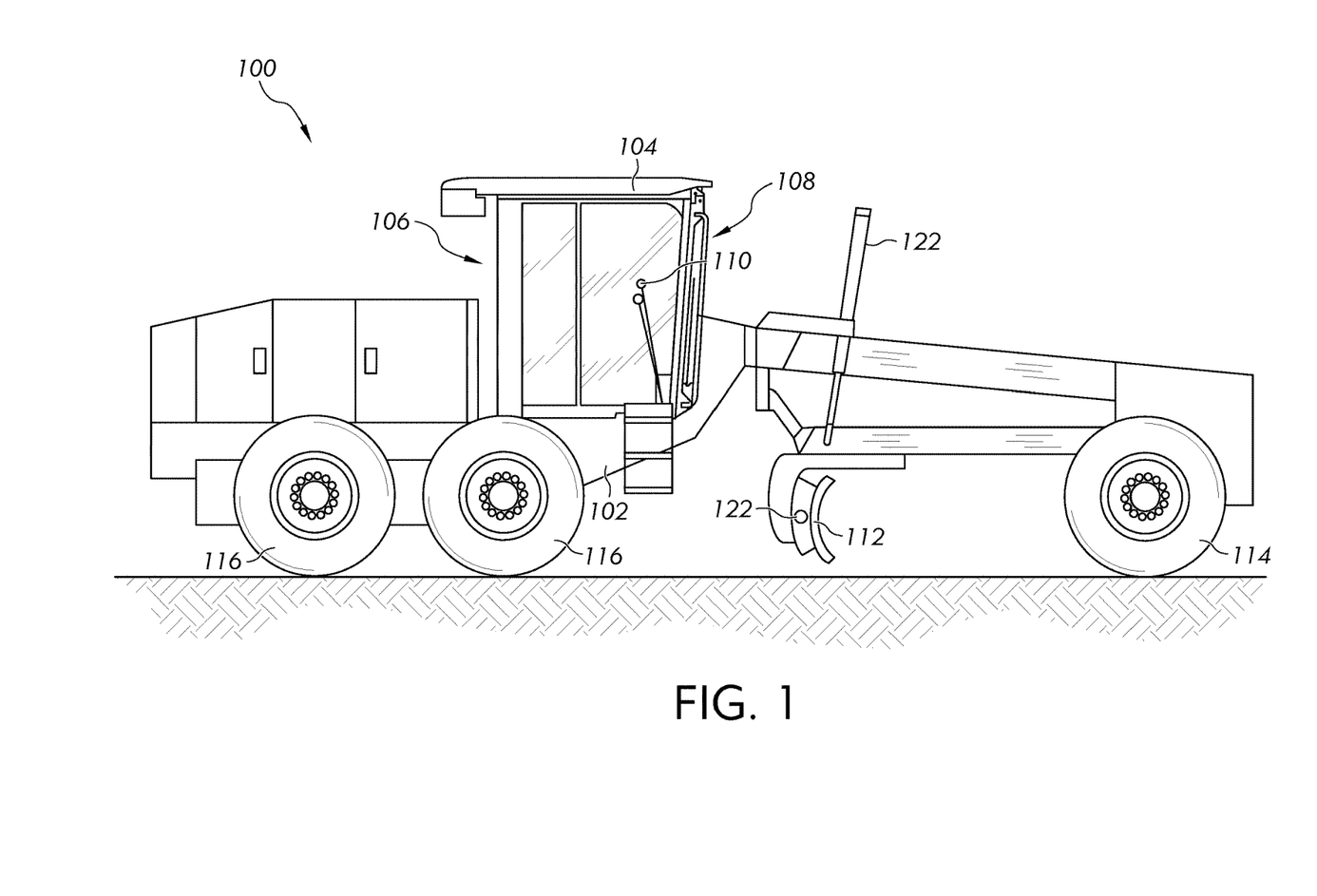
FIG. 1 is a side view of a work machine.

Referring to FIG. 1, a work machine 100 is shown. In one embodiment, the work machine 100 may be a motor grader. However, this disclosure is not limited to such any particular type of machine. Rather, the teachings of this disclosure may be applicable to any machine including, but not limited to, a machine in the agricultural, construction, forestry, on-highway, off-highway, and commercial industries.

The work machine 100 in FIG. 1 has a chassis 102 coupled to a front set of wheels 114 and a rear set of wheels 116. Also coupled to the chassis 102 may be a cabin 104 that has a back portion 106 and a front portion 108. The cabin 104 may also define an interior region where a user may control the work machine 100 with a plurality of controls 110. Although not shown, an engine for producing power and a transmission for transferring power to the wheels 114, 116 may be coupled to the chassis 102.

In one aspect of the present disclosure, the plurality of controls may be manipulated by the user to control an implement 112 such as a boom, blade, bucket, etc. The plurality of controls 110 may be switches, levers, push buttons, a steering wheel, and any other similar control mechanism. In the embodiment of FIG. 1, the implement 112 may be repositionable relative to the work machine through a plurality of actuators 122 coupled between the implement 112 and the chassis 102. However, this disclosure is not limited to such an embodiment. This disclosure is equally applicable to any type of implement that may be part of a work machine and require control by the user.

Figure 2:
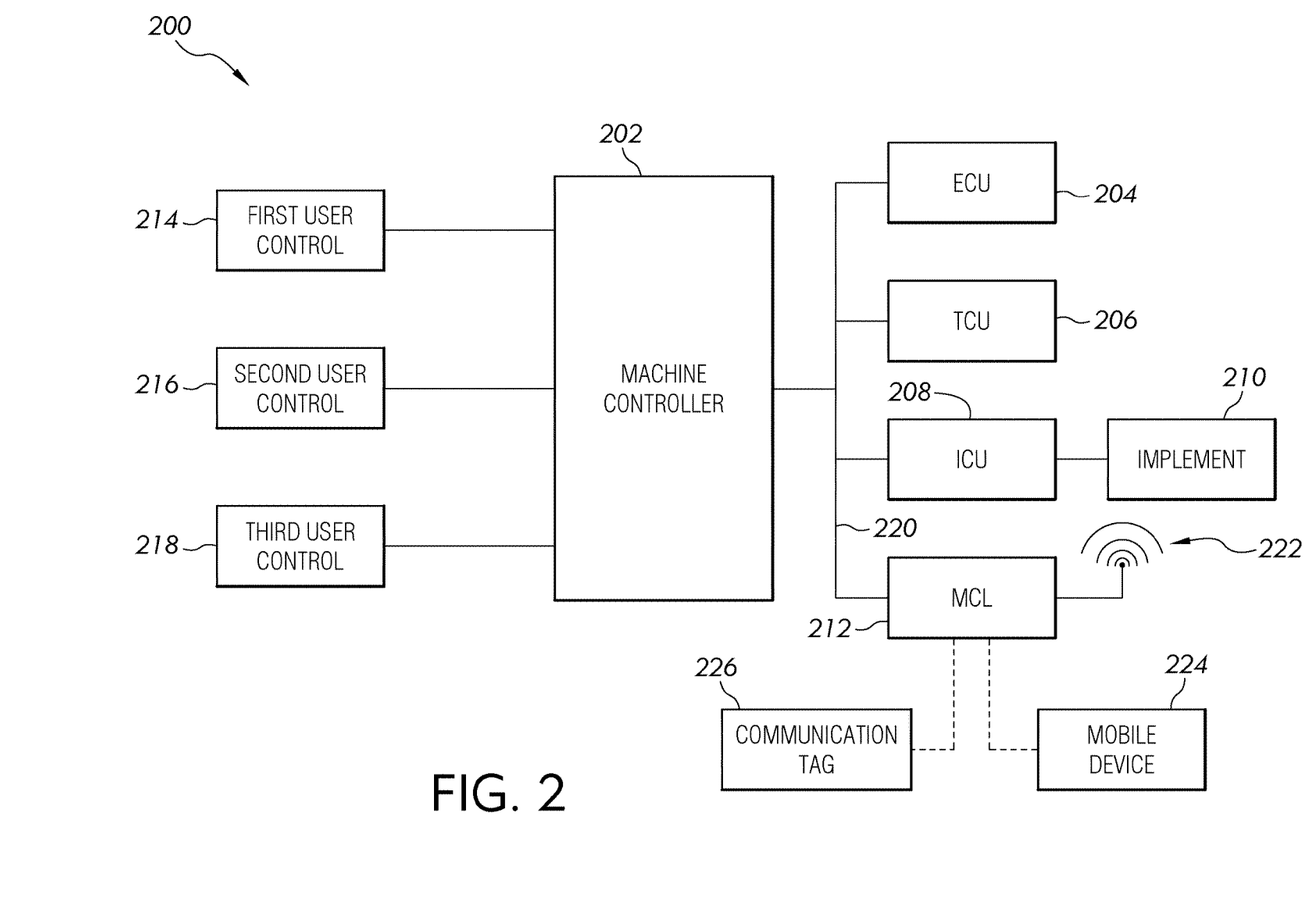
FIG. 2 is a controls diagram of the work machine.

Referring now to FIG. 2, a control system 200 of a work machine (e.g., such as the motor grader 100 in FIG. 1) is provided. The control system 200 may include a machine controller 202 for controlling the functionality of the machine. The controller 202 may include a plurality of inputs and outputs. For instance, the controller 202 may receive commands or instructions from a machine operator via a plurality of user controls. In FIG. 2, the plurality of user controls includes a first user control 214, a second user control 216, and a third user control 218. In one non-limiting example, the first user control 214 may be a steering wheel or joystick used for steering or controlling a direction of travel of the work machine. The second user control 216 may be a joystick, lever, pedal, or other known control for controlling a speed of the work machine. Moreover, the third user control 218 may be an ignition switch for a key or a push button, for example, in which the operator triggers the engine of the machine between an on and off condition. Other user controls may also be incorporated into the control system 200 of FIG. 2, including but not limited to controls for braking, controlling an implement, hydraulic controls, engine controls, transmission controls, etc. The present disclosure is not limited to any number or type of controls. As shown in FIG. 2, the user controls may be electrically coupled to the controller 202 to allow the machine operator to send commands thereto for controlling the machine.

As described above with reference to FIG. 1, the work machine may include an engine or prime mover for producing power and a transmission for transferring the power to the front and rear wheels. The engine may be controlled by an engine control unit (ECU) 204, which as shown in FIG. 2, may be in electrical communication with the controller 202. Likewise, the transmission may be controlled by a transmission control unit (TCU) 206, which may also be in electrical communication with the controller 202. The ECU 204 and TCU 206 may be electrically coupled to the controller 202 via hard wiring or a wireless connection. In one non-limiting example, the controller 202 may communicate with the ECU 204 and TCU 206 over a communication network such as a controller area network (CAN) 220.

As shown in FIG. 2, the controller 202 may also be in electrical communication with an implement control unit (ICU) 208 for controlling a work implement 210 such as the motor grader blade 112 in FIG. 1. While a separate ICU 208 is shown in FIG. 2, one skilled in the art will appreciate that not all work machines include a separate controller for controlling the implement. In some embodiments, for example, the controller 202 may directly control the implement 210. In the embodiment of FIG. 2, however, the ICU 208 may be in communication with the controller 202 via the CAN link or by any other known electrical connection.

The control system 200 of FIG. 2 may also include a mobile communication link (MCL) 212. The MCL 212 may be a controller separate from the machine controller 202, but it is in electrical communication with the controller 202 via the CAN link 220 or other known means. The MCL 212 may be located on the work machine and transmit or broadcast a wireless signal 222. For example, the MCL 212 can connect the machine to a satellite link, an antenna-based cellular phone base, a cloud network, or other communication system. The wireless signal 222 may be in the form of a wireless network such as Wi-Fi to which a mobile device 224 such as a smartphone, tablet, computer, computing device, or other electronic device may be wirelessly connected. The wireless network may allow the mobile device 224 to connect to the Internet, for example, or to a local area network.

In this embodiment, the mobile device 224 may communicate wirelessly with the MCL 212, which in turn may communicate with the controller 202. The MCL 212 may also connect to a separate link or remote wireless system that tracks machine hours, fluid levels, error or diagnostic codes, load profiles, speed profiles, usage criteria (e.g., number of cycles), and other information related to the machine.

The MCL 212 may also be used for tracking the performance of maintenance checks on the machine. In order to maintain the machine at its optimal or desirable operating condition, a maintenance schedule can be provided with a list of maintenance items to be performed on the machine. These maintenance items may be daily or routine checks that maintain the machine operating at a desirable level. In one example, the maintenance items may be performed at a predefined number of machine hours. In another example, one or more maintenance items may be performed based on usage criteria, such as number of cycles of a particular function. The controller 202 or MCL 212 can be programmed to track when maintenance checks need to be performed on the machine, and in at least one instance an alert may be triggered to communicate with a machine operator, service technician, fleet owner, or other third party the status of each maintenance item.

Figure 3:
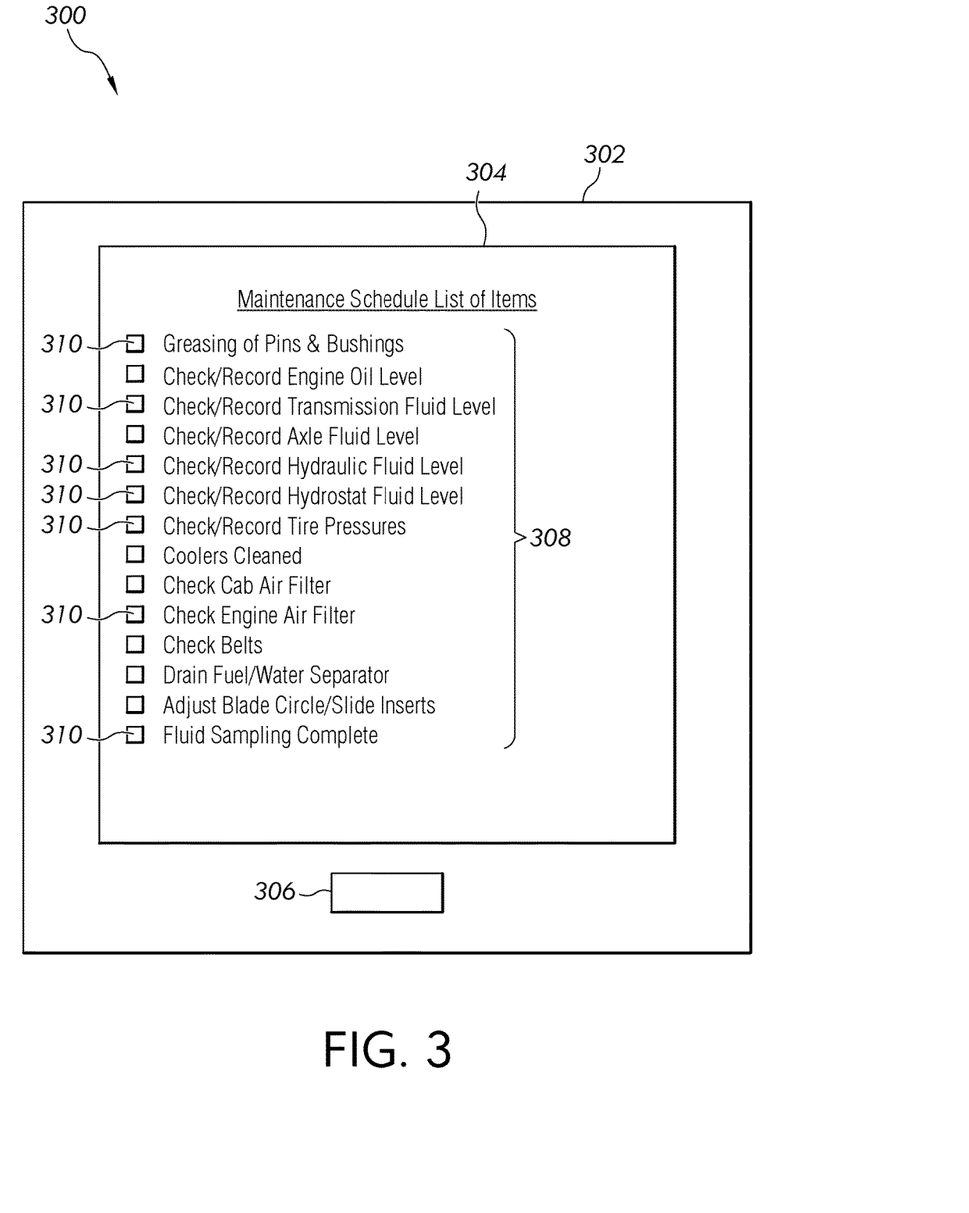
FIG. 3 is a simplified schematic of one embodiment of a maintenance schedule application for use on a mobile device.

In addition to the MCL 212, a maintenance schedule mobile application 300 may be used on the mobile device 302 to perform the maintenance checks. Referring to FIG. 3, the mobile application 300 may be downloaded, for example, on a smartphone or tablet. When opened or enabled on the mobile device 224, the mobile application 300 can guide a machine operator or technician through the list of maintenance activities. In FIG. 3, the mobile device 302 can include a screen 304 (e.g., a touchscreen) for displaying the contents of the mobile application 300. A user button or control 306 can allow the operator to control the mobile device 302.

When opened, the mobile application 300 can display one or more maintenance activities 308 that form part of a maintenance schedule. The MCL 212 can provide the wireless network that enables the operator to open and use the mobile application when performing the maintenance activities. Moreover, the mobile application 300 may include a check box 310 or other trigger in which a user selects to acknowledge completion of an individual maintenance activity. As shown in FIG. 3, the maintenance activities can include greasing pins or bushings on the machine, check and record engine oil level, check and record transmission fluid level, check and record axle fluid level, check and record hydraulic fluid level, check and record hydrostat fluid level, check and record tire pressures, clean a machine cooler, check a cab air filter, check an engine air filter, check belts, drain a fuel/water separator, adjust a blade circle/slide inserts, and check fluid sampling. This is a non-exhaustive list of maintenance activities that may be performed on the machine, and there may be other items depending upon the type of work machine or vehicle. Further, there may be fewer maintenance activities to perform depending upon the time of day, number of machine hours, time between maintenance checks, and the like. Thus, the illustrated embodiment of FIG. 3 only provides one example of the mobile application 300 and one of many different lists of maintenance activities that may be performed.

In addition, the check box feature 310 shown in FIG. 3 is only one of a plurality of ways a user or operator may acknowledge or affirm when a maintenance activity is completed. In one embodiment, an electronic communication tag 226 may be used. The tag 226 may include a quick response (QR) code, a bar code, radio-frequency identification code, and the like. There may be several tags disposed at different locations on the machine where an individual maintenance activity is performed. For example, one tag 226 may be located at the engine where the engine oil level is checked. A second tag 226 may be located near one of the wheels where the tire pressure is checked. Another tag 226 may be located near a pin or bushing that is greased as part of the maintenance activity. In any event, an operator or technician is required to move about the machine to multiple locations to complete the maintenance activities.

The mobile device 224 or other scanning device may be used to scan the code on the communication tag 226. By scanning the tag 226 at one location on the machine, a signal may be communicated to the MCL 212 indicative of a status of the maintenance activity at that location. For instance, if the operator or technician checks the engine oil level and then scans the communication tag 226 at that location, a signal may be communicated to the MCL 212 indicating a status that the engine oil level maintenance activity has been completed. The MCL 212 can then communicate with the controller 202 the status of each maintenance activity that is part of a maintenance schedule. In this manner, the controller 202 and MCL 212 are able to track the performance of the maintenance schedule.

In addition to tracking the performance of maintenance activities as part of a maintenance schedule for a given machine, the controller 202 or MCL 212 may also communicate with the operator or technician regarding the completion or lack thereof of the maintenance activities. For example, the controller 202 may trigger an audible or visual alarm or message to the operator or technician on a dashboard or screen of the machine indicating when one or more maintenance activities still need to be completed. The controller 202 or MCL 212 may also send an alert to the mobile device 224 if one or more maintenance activities are not complete. In one such example, a message may appear on the screen 304 via the mobile application 300 indicating which maintenance activity remains incomplete. In this manner, the controller 202 and MCL 212 provide a communication mechanism to the operator or technician to complete all maintenance activities in a timely manner.

If the work machine is part of a group or fleet of work machines, a similar type message can be communicated to a third party or owner of the fleet. The controller 202 or MCL 212 may send an alert indicating which, if any, maintenance activities are completed. In doing so, an owner can effectively track the performance of maintenance checks on each individual work machine within his or her fleet.

Figure 4:
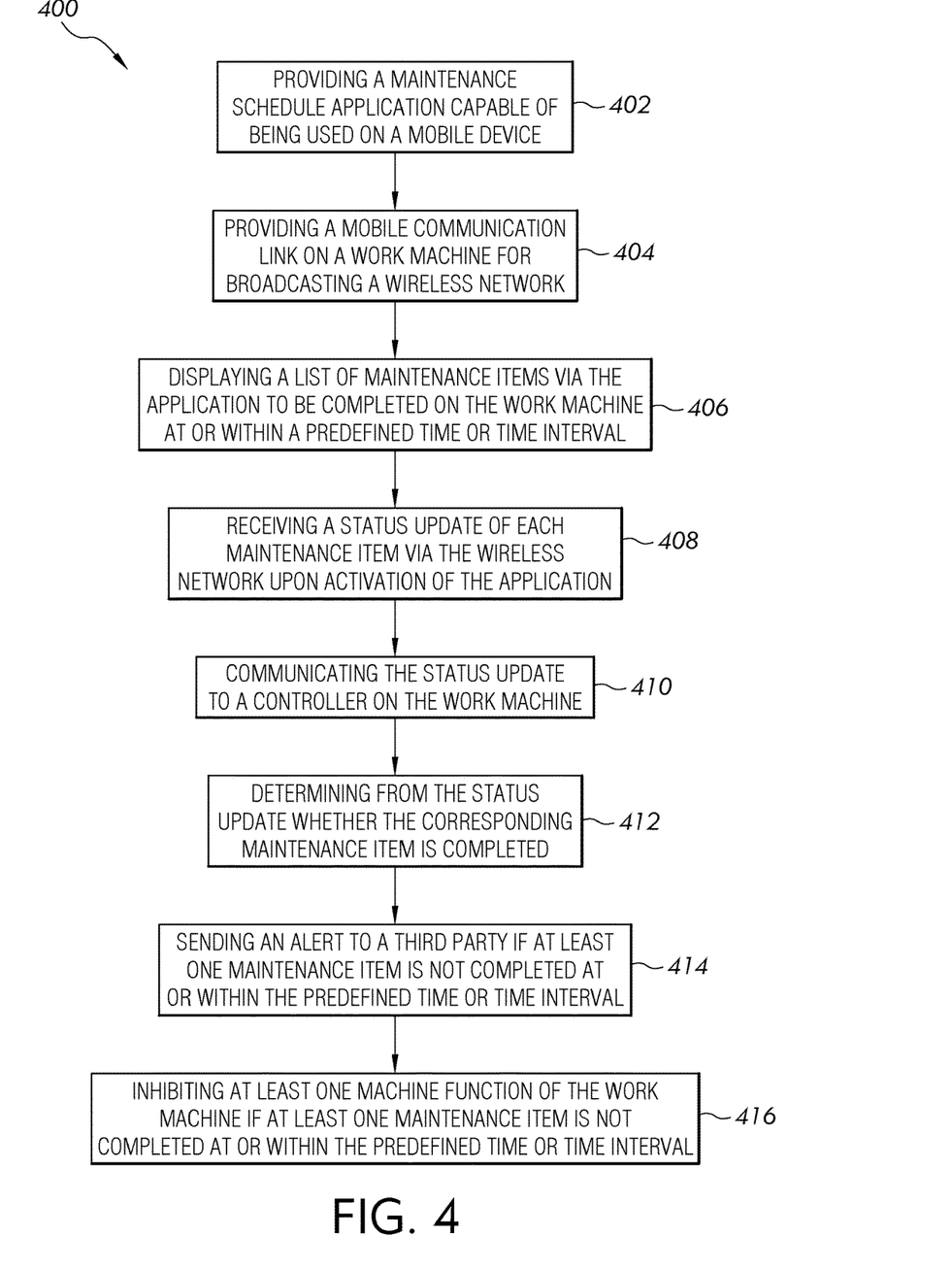
FIG. 4 is a method of tracking and limiting machine performance based on performance of a work machine maintenance schedule.

In addition to the foregoing, the present disclosure provides a further means for tracking and encouraging the performance of all maintenance activities within a given maintenance schedule. In one embodiment, a method 400, as shown in FIG. 4, may be provided by which machine functionality and performance can be inhibited if maintenance is not completed on the work machine. In its simplest form, daily maintenance activities may be required to be completed before the machine is enabled for a predefined period of time. The predefined period of time may be an individual shift for a given day, a day, a week, a number of machine hours, or any other predefined period of time. The length or duration of the predefined period of time may be set by a maintenance schedule which lists the maintenance activities to be completed. The maintenance schedule can be part of software or otherwise communicated or downloaded to the controller 202.

The method 400 of FIG. 4 includes a plurality of blocks or steps that may be executed to control machine performance until all maintenance activities defined by a maintenance schedule are completed. For example, a first block 402 may be executed by providing the maintenance schedule to the controller 202 and further providing a maintenance schedule mobile application 300 that is capable of being executed on a mobile device. The mobile application can take many forms, and the one illustrated in FIG. 3 is only one example of such.

A second block 404 of the method 400 may be executed by providing a mobile communication link, or MCL 212, on a work machine for transmitting or broadcasting a wireless network. In this manner, the mobile device may connect to the wireless network according to any known method. Once connected, the mobile device may be able to open the maintenance schedule mobile application in order to perform the maintenance activities that are part of the maintenance schedule.

As described above, the mobile application can display the list of maintenance activities or items in block 406. The method 400 can be defined such that each of the maintenance activities is required to be completed before the machine is able to fully function. As an operator, technician or other user of the mobile application executes the maintenance activities, block 408 of the method 400 is executed by sending a status of each maintenance activity to the MCL 212. The status may be completed or not yet completed, for example. The MCL 212 can track which maintenance items are completed based on each status it receives from either the mobile application or the mobile device. Alternatively, if a communication tag 226 is scanned, a signal may be sent to the MCL 212 indicative of the status of that particular maintenance activity. Communication between the MCL 212, the mobile device 224, mobile application, and communication tag 226 may occur over the wireless network 222 that is transmitted by the MCL 212.

In block 410, the MCL 212 can communicate the status of each maintenance activity to the controller 202. The controller 202 can then execute block 412 and determine from the status whether all of the maintenance activities are completed. If one or more maintenance activities are not completed, the controller 202 can send an alert in block 414 to the operator, service technician or a third party indicating that at least one maintenance activity is not completed at or within the predefined time or time interval. The controller 202 may further alert the owner of a fleet, as described above, which maintenance activity remains to be completed. Moreover, the controller 202 may also communicate to each of the aforementioned parties when all of the maintenance activities are completed and the machine is enabled for machine operation.

In a further step, the controller 202 can execute block 416 and inhibit at least one machine function of the work machine if there is at least one maintenance activity that is not completed. For example, the controller 202 can prevent the machine from starting until all maintenance activities are completed. In another example, the controller 202 may limit engine speed or engine power. In a further example, the controller 202 may limit the transmission to a specific gear or speed ratio. For instance, the transmission may be limited to neutral and thus not be able to move in either a forward or reverse direction. In yet a further example, the controller 202 may limit machine ground speed. The controller 202 may also be able to limit certain hydraulic or implement functions. In the embodiment of FIG. 1, for example, the controller 202 may limit the motor grader 100 such that the blade 112 is disabled until all of the maintenance activities are completed. The aforementioned examples are not intended to be limiting, and other limitations may be used by the controller 202 to limit machine functionality and thereby encourage the completion of all maintenance activities for a given maintenance schedule.

Although not shown in FIG. 4, the controller 202 may also track the time between maintenance checks. For example, a given maintenance schedule may require fluid levels to be checked every 12 hours of machine operation or after a certain number of cycles of a particular function are performed. The controller 202 can have a built-in clock or may communicate over the CAN link 220 to receive machine hours or number of cycles. As such, when all maintenance activities are completed the controller 202 can begin to count or track machine hours until 12 hours of machine operation have surpassed and another maintenance is required. The same may be true after a threshold number of cycles have been performed. The controller 202 may communicate a message to an operator via an in-cab monitor (not shown) that fluid levels need to be checked again. The controller 202 may further be programmed to inhibit machine operation, as described above, until the fluid levels are checked. In a related embodiment, the controller 202 may be programmed to communicate to the operator that within a threshold period of time (e.g., 15 minutes) the machine requires maintenance and machine performance will be inhibited until the maintenance is completed. Safety and other considerations can be programmed into the controller 202 to ensure that machine functionality is not inhibited until it is safe to do so.

In another embodiment, the present disclosure may provide a tracking process or system capable of ensuring that maintenance items are completed thoroughly and that an operator or technician is not simply "going through the motions." In this embodiment, an operator or technician may be required to alert the controller 202 or MCL 212 via the mobile device 224 or other feature that he or she is going to perform the maintenance items. Alternatively, this may be triggered once the operator or technician scans a communication tag 226. The controller 202 may have a predefined, minimum threshold amount of time in which it would take to perform one or more maintenance items. In the mobile application, for example, the operator or technician may be required to click on an icon indicating which maintenance item he or she is about to perform. Once the icon is clicked, a timer may track the amount of time that it takes for the maintenance to be completed.

The tracking system may detect that if the operator or technician completes the task in an amount of time that is less than the minimum threshold, an alert may be triggered to confirm with the operator or technician that the task was completed. In addition, an alert or signal may be sent to a third party such as a fleet manager that a certain maintenance item was executed in less time than the minimum threshold. While the operator may have completed the task in the detected amount of time, particularly if a fluid level was satisfactory and no additional fluid is needed, but a system is incorporated into the maintenance schedule to ensure that maintenance checks are thoroughly completed.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of controlling performance of a work machine, comprising:
   providing a machine controller for controlling at least one machine function and a mobile communication link;
   providing a connection to a wireless network with the mobile communication link;
   connecting the mobile communication link to a mobile device via the wireless network when a maintenance schedule mobile application is enabled on the mobile device, the maintenance schedule mobile application including a maintenance schedule displayed on a display of the mobile device, the maintenance schedule having at least one maintenance item to be completed on the work machine before the work machine is enabled to perform the at least one machine function;
   receiving by the mobile communication link a status for the at least one maintenance item;
   communicating the status to the machine controller;
   determining by the machine controller if the at least one maintenance item is completed based on the status; and
   enabling the machine to perform the at least one machine function with the machine controller if the at least one maintenance item is completed.

2. The method of claim 1, further comprising inhibiting the machine from performing the at least one machine function if the at least one maintenance item is not completed.

3. The method of claim 2, wherein the inhibiting step comprises disabling an ignition switch on the work machine.

4. The method of claim 2, wherein the inhibiting step comprises limiting engine speed, transmission speed, or ground speed.

5. The method of claim 2, wherein the inhibiting, step comprises limiting engine power.

6. The method of claim 2, wherein the inhibiting step comprises disabling an implement from performing the at least one machine function.

7. The method of claim 2, wherein the inhibiting step comprises limiting transmission speed, transmission torque, or transmission operability to a predefined speed or gear ratio.

8. The method of claim 1, wherein the determining step comprises detecting if a pin or bushing is greased, an oil level is checked, a tire pressure is checked, a cooler is cleaned, an air filter is checked, a fuel/water separator is drained, a fluid sample is taken, or a mechanical belt is checked.

9. The method of claim 1. further comprising sending an alert with the machine controller or the mobile communication link when the at least one maintenane item is not completed.

10. The method of claim i comprising:
    executing the enabling step for a predefined period of time;
    alerting a machine operator to complete the at least one maintenance item after the predefined period of time; and
    inhibiting the machine from performing the at least one machine function after the predefined period of time until the at least one maintenance item is completed.

11. The method of claim 2, wherein the at least on maintenance item is performed based on one of machine hours or usage criteria, where the usage criteria includes cycles of a particular function.

12. A method of controlling a work machine, comprising:
    providing a machine controller for controlling at least one machine function, a mobile communication link, and a maintenance schedule mobile application executable on a mobile communication device, the mobile application including a maintenance schedule displayed on a display of the mobie device, the maintenance schedule having a plurality of maintenance items to be completed at a plurality of locations on the work mahcine;
    providing a connection to a wireless network with the mobile communication link;
    receiving by the mobile communication link a status of each of the plurality of maintenance items when the mobile application is being executed;
    communicating the status of each of the plurality of maintenance items to the machine controller;
    determining by the machine controller if each of the plurality of maintenance items is completed before the machine is enabled; and
    controlling the machine with the machine controller to perform the at least one machine function if each of the plurality of maintenance items is completed.

13. The method of claim 12, further comprising:
    providing a communication tag at each of the two or more locations on the work machine; and
    sending a signal from the communication tag to the mobile communication link when one of plurality of maintenance items is completed.

14. The method of claim 12, further comprising wirelessly connecting the mobile communication link to the mobile communication device via the wireless network during the receiving step.

15. The method of claim 12, wherein the controlling step comprises enabling the machine to perform the at least one machine function for a predefined period of time.

16. The method of claim 15, further comprising inhibiting the machine from performing the at least one machine function after the predefined period of time until the plurality of maintenance items are completed.

17. A control system of claim 16 of a work machine, comprising;
    a controller for controlling the work machine to perform at least one machine function;
    an engine control unit for controlling an engine of the work machine, the engine control unit being in electrical communication with the controller;

a transmission control unit for controlling a transmission of the work machine, the transmission control unit being in electrical communication with the controller; and a mobile communication controller disposed in electrical communication with the controller, the mobile communication controller configured to provide a connection to a wireless network from a location on the work mahcine;

wherein, the mobile communication controller is adapted to receive a status from a remote communication device regarding one or more maintenance items to be completed on the work machine, and the mobile communication controller operably communicates the status to the controller;

further wherein, the controller operably controls the work machine to perform the at least one machine function based on the status;

a first communication tag coupled to the work machine at a first location and a second communication tag coupled to the work machine at a second location, the first and second communication tags being in electrical communication with the mobile communication controller;

wherein, the first tag sends a first status to the mobile communication controller via the wireless network when one maintenance item is completed at the first location, and the second tag sends a second status to the mobile communication controller via the wireless network when a second maintenance item is completed at the second location.

18. The control system of claim 17, wherein the controller operably inhibits the work machine from performing the at least one machine function if the status is indicative of the one or more maintenance items not being completed.

19. The control system of claim 17, further comprising a maintenance schedule mobile application configured to be enabled on the mobile communication device, the mobile application being electrically coupled to the mobile communication controller to send the status regarding the one or more maintenance items.

20. The control system of claim 17, wherein:

the controller communicates to the engine control unit to limit engine speed or engine power when the one or more maintenance items is not completed; or the controller communicates to the transmission control unit to limit transmission speed or transmission torque when the one or more maintenance items is not completed.

* * * * *